United States Patent [19]

Mishina et al.

[11] Patent Number: 4,996,781
[45] Date of Patent: Mar. 5, 1991

[54] VAPOR REFLOW TYPE SOLDERING APPARATUS WITH AN IMPROVED FLUX SEPARATING UNIT

[75] Inventors: Haruo Mishina, Ushiku; Yushi Takahashi, Matsudo; Keizo Tsuchiya, Kashiwa, all of Japan

[73] Assignee: Hitachi Techno Engineering Co., Ltd., Tokyo, Japan

[21] Appl. No.: 426,434

[22] Filed: Oct. 25, 1989

[51] Int. Cl.$^5$ .................................... F26B 21/06
[52] U.S. Cl. ............................ 34/74; 34/78; 118/61
[58] Field of Search ............... 34/77, 78, 79; 118/729, 118/78, 61, 58; 432/197; 228/180.1

[56] References Cited

U.S. PATENT DOCUMENTS

| | | | |
|---|---|---|---|
| 4,628,616 | 12/1986 | Shirai et al. | 34/78 |
| 4,658,513 | 4/1987 | Strattman | 34/78 |
| 4,735,001 | 4/1988 | Mishina et al. | 34/78 |
| 4,776,105 | 10/1988 | Mishina et al. | 34/78 |
| 4,809,443 | 3/1989 | Mishina et al. | 34/73 |

Primary Examiner—Henry A. Bennet
Attorney, Agent, or Firm—Antonelli, Terry, Stout & Kraus

[57] ABSTRACT

A vapor reflow type soldering apparatus comprising a tank that is filled with saturated vapor of a heat medium and a passage extending through the tank. An article to be processed is transferred through the passage and is brought into contact with the saturated vapor so that a solder material on the article is heated and molten. Also, a discharge gas collecting unit is provided in the apparatus and includes a chilled water system through which water at a constant temperature is caused to flow. The heat medium is collected out of the discharge gas from the apparatus and is returned back to a tank. A flux separating unit is connected to the chilled water system of the discharge gas unit through a pipes and switching valves. The chilled water in the chilled water system is selectively introduced into the flux separating unit to cool the heat medium within the tank, and a flux molten into the heat medium is removed from the molten solder material.

11 Claims, 4 Drawing Sheets

VAPOR REFLOW TYPE SOLDERING APPARATUS WITH AN IMPROVED FLUX SEPARATING UNIT

BACKGROUND OF THE INVENTION

The present invention relates to a vapor reflow type soldering apparatus, and more particularly to an improvement of a unit for separating flux from heat medium.

Recently, electronic parts have been mounted onto a printed circuit board with higher density. These electronic parts include chip parts such as an IC having electrode terminals in four directions in a plane, i.e., a so-called flat pack IC, a resistor, capacitor and the like. The soldering operation for mounting the electronic parts onto the printed circuit board is a final step of the manufacture line and largely affects a performance of a final product. For this reason, it is considered that the soldering technique is the most important one in various steps of the manufacture line.

A vapor reflow type soldering apparatus, as a measure for performing the soldering operation in such a manufacture line is shown in, for example, U.S. Pat. Nos. 4,612,712, which is 4,658,513 and, which is 4,628,616 which was assigned to the present assignee. This apparatus is used for heating an article to be processed by passing the article through the vapor of a heat medium and utilizing the condensing latent heat of the heat medium. A material having a large specific weight relative to air under vapor state is used as the heat medium in order to make the temperature distribution of the vapor uniform and avoid undesirable excessive heating of the article to be processed.

The present inventors et al made certain proposals concerning the vapor reflow type soldering apparatus. More specifically, in U.S. Pat. No. 4,735,001 issued on Apr. 5, 1988, they propose a structure where heat is collected from returned heat medium after the heating of the article to be processed to thereby save a necessary heat quantity for evaporation and prevent faults of soldering due to the deficiency of the vapor. U.S. Pat. No. 4,776,105 issued on Oct. 11, 1988 shows the provision of a device for collecting the heat medium and a dividable conveyor. U.S. Pat. No. 4,809,443 issued on Mar. 7, 1989 shows the provision of a device for separating flux contained in the heat medium.

Also, copending U.S. patent application Ser. No. 385,160 filed on July 26, 1989 proposes a structure in which a position and a width of a vapor blowout port are variable in response to a change of a width of the article to be processed. Also, a copending U.S. patent application Ser. No. 07/425,025 filed on Oct. 23, 1989 and entitled "VAPOR REFLOW TYPE SOLDERING APPARATUS WITH IMPROVED COOLERS" proposes an improvement of coolers for collecting heat medium.

The vapor reflow type soldering apparatus shown in the above patents of the present inventors is provided with a tank which is filled with the heat medium vapor and a passage or path which is provided through the tank and through which the article to be processed is transferred. Coolers for collecting the vapor to prevent the escape thereof from the apparatus are provided on both sides of the passage close to the tank, respectively.

Furthermore, the apparatus shown in U.S. Pat. No. 4,735,001 is provided with a device for collecting the heat medium from the gas discharged from the apparatus. The heat medium collected by the coolers and the collecting device is returned back to the tank and is reused together with the heat medium which drops after having come in contact with the article to be processed. In order to keep well the performance of the heat medium to be reused, the apparatus shown in U.S. Pat. No. 4,809,443 is provided with a device for separating the flux from the liquefied heat medium collecting in a bottom portion of the tank.

SUMMARY OF THE INVENTION

An object of the invention is to provide a vapor reflow type soldering apparatus for effectively separating a flux from a heat medium.

Another object of the invention to provide a vapor reflow type soldering apparatus which is capable of securely performing a soldering operation, while keeping well the performance of a heat medium to be reused with a high thermal efficiency.

The present invention, in order to attain these and other objects, is intended to effectively combine the collecting unit and the separating unit. The collecting unit and the separating unit are used to effectively collect flux and heat medium by cooling the discharge gas from the apparatus and the liquid heat medium in the apparatus, respectively. Accordingly, the present inventors have noted that the heating of the heat medium is stopped during the separation of the flux and the thermal load imposed on the collecting unit is reduced. In view of this fact, the collecting unit and the separating unit are provided in the vapor reflow type soldering apparatus, and cooling water systems for those units are well combined to perform the separation of the flux in a short time.

According to one aspect of the invention, there is provided a vapor reflow type soldering apparatus comprising a tank means for filling saturated vapor of a heat medium, means for transferring an article to be processed through the tank means to bring a solder material on the to-be-processed article into contact with the saturated vapor to heat and melt the solder material, a discharge gas collecting means having a chilled water system for cooling discharge gas from the tank means, collecting the heat medium contained in the discharge gas and returning the heat medium back to the tank means, and means for separating a flux molten out of the melted solder material from the heat medium in the tank means, the separating means being connected to the chilled water system of the discharge gas collecting means to selectively introduce chilled water of the chilled water system to cool the heat medium.

According to another aspect of the invention, there is provided a vapor reflow type soldering apparatus comprising a tank storing a liquid heat medium, a heater means for boiling the heat medium within the tank to generate saturated vapor thereof, a passage defined through the tank, means for conveying an article to be processed along the passage to bring a solder material on the article in contact with the saturated vapor filled within the tank to heat and melt the solder material, cooling means provided respectively on portions of the passage on both sides of the tank for cooling the saturated vapor to collect the heat medium therein, means for collecting the heat medium from discharge gas passing through the passage to return the heat medium back to the tank, the collecting and returning means having a chilled water system through which a constant temperature chilled water is caused to pass for cooling the discharge gas and condensing the heat medium, means connected to the tank for separating a flux molten out of the melted solder material by cooling the heat medium, and means for selectively introducing the chilled water of the chilled water system of the discharge gas collecting means into the separating means, the introducing means including pipes for connecting the separating means and the chilled water system and a switching valve means for selectively providing communication of the chilled water system with the pipes.

BRIEF DESCRIPTION OF THE DRAWINGS

The aforesaid and other objects, features and advantages of the invention will become more apparent from the description which will be made hereinunder with reference to the accompanying drawings in which.

DESCRIPTION OF THE PREFERRED EMBODIMENTS

Preferred embodiments of the invention will now be described with reference to the accompanying drawings.

Figure 1:
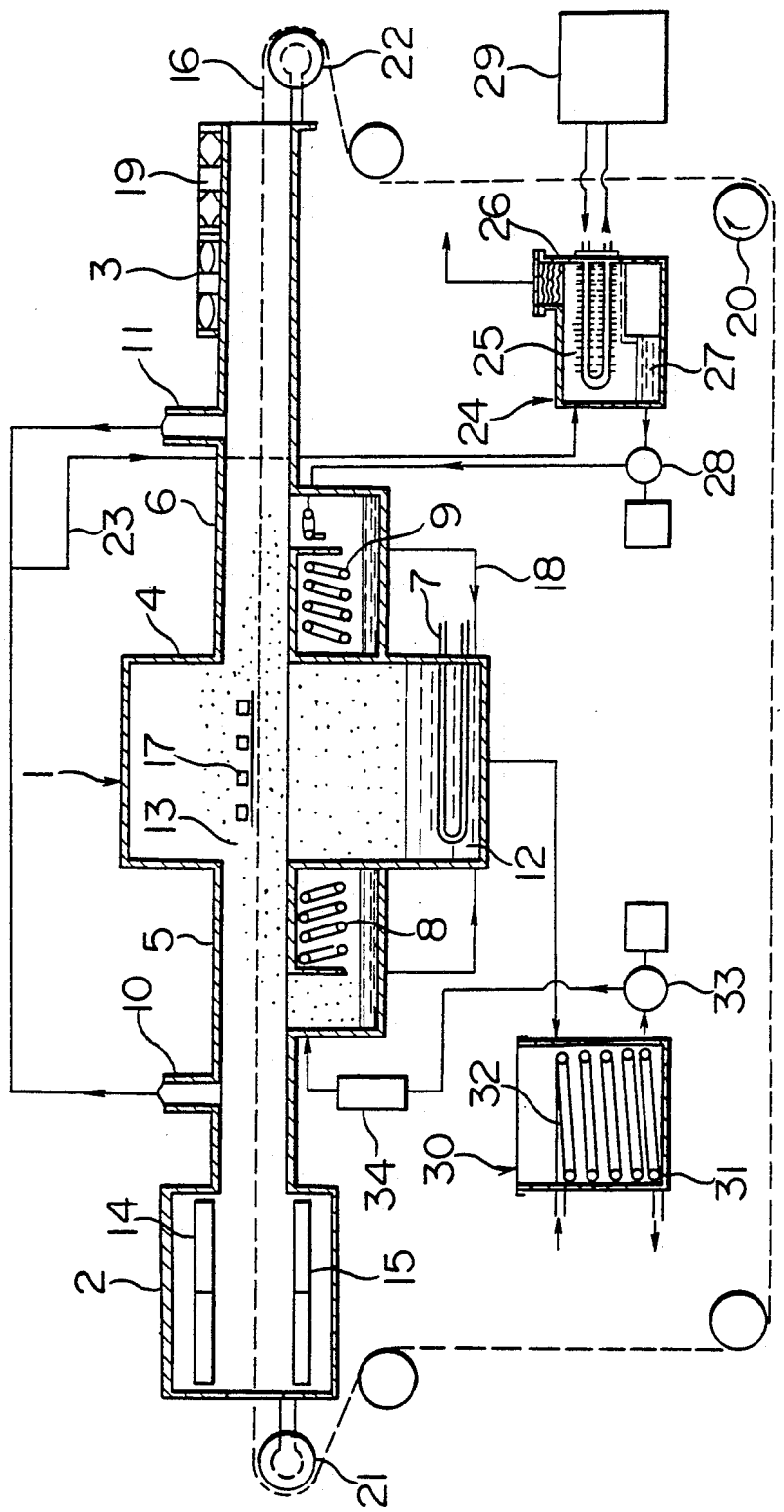
FIG. 1 is a cross-sectional view showing a structure of a vapor reflow type soldering apparatus to which the invention is applicable.

FIG. 1 shows a vapor reflow apparatus to which the invention is applicable. The apparatus includes a reflow chamber 1, a preheating chamber 2 and a cooling chamber 3 disposed, respectively, upstream and downstream of the reflow chamber 1, and a conveyor 16 for transferring article 17 to be processed, i.e., to be soldered, through these chambers. Further, provided are a discharge gas collecting unit 24 and a filtering unit 30 which are connected to the reflow chamber 1.

An upper preheater 14 and a lower preheater 15 are provided in the preheating chamber 2.

The reflow chamber 1 includes a heat generating tank 4, an inlet side delivery path 5 for the to-be-soldered articles 17, an outlet side delivery path 6 for the articles, an inlet side cooler and an outlet side cooler. A heater 7 is provided in the vapor generating tank 4 so as to be immersed in a liquid heat medium 12 contained in a bottom portion of the tank 4. The tank 4 serves to generate a saturated vapor 13 of the heat medium 12, to bring the saturated vapor 13 of the heat medium 12 into contact with the articles 17 to be transferred through the tank, and to heat and melt a solder on the solder articles to perform the soldering operation. The inlet side delivery path 5 and the outlet side delivery path 6 are in communication with the interior of the vapor generating tank 4. An inlet side discharge port 10 is provided in the inlet side delivery path 5, while an outlet side discharge port 11 is provided in the outlet side delivery path 6. An inlet side cooling coil 8 is provided in the inlet side cooler, and an outlet side cooling coil 9 is provided in the outlet side cooler. The inlet and outlet side coolers are arranged so as to return the heat medium 12 back to the bottom portion of the vapor generating tank 4 through pipes 18.

Cooling fans 19 are provided in the cooling chamber 3 so that the soldered article or product transferred through the outlet side delivery path 6 is cooled down.

The conveyor 16 is composed of a drive sprocket wheel 20, driven sprocket wheels 21 and 22, and a conveying band such as a mesh which is wound between the sprocket wheels. One of the driven wheels 21 is located outside the preheating chamber 2 through which the articles 17 are transferred into the apparatus, and the other driven wheel 22 is located outside the cooling chamber 3 through which the products are transferred out of the apparatus. The conveyor 16 is used to transfer the solder articles 17, which are placed on the conveying band, from the inlet side delivery path 5 into the interior of the vapor generating tank 4, and subsequently from the outlet side delivery path 6 to the outside.

In the discharge gas collecting unit 24, there are provided a discharge gas cooling coil 25, a demister 26, and a moisture separator 27. Outside the collecting unit 24, there are provided a chiller 29 and pump 28 which are connected with the collecting unit 24. The discharge gas of the heat medium 12 is introduced from the inlet side discharge port 10 and outlet side discharge port 11 through a discharge gas pipe 23 into the discharge gas collecting unit 24. A cooled water is supplied to the discharge gas cooling coil 25 from the chiller 29. The discharge gas cooling coil 25 is adapted to cool and liquefy the discharge gas of the heat medium 12. The moisture separator 27 is adapted to separate the heat medium 12 and the water from each other by utilizing a difference in the specific weights thereof. The demister 26 is used to collect a part of the discharge gas of the heat medium 12 that is not liquefied in the discharge gas collecting unit 24. The pump 28 is used to return the thus collected heat medium 12 back into the outlet side cooler having the outlet side cooling coil 9 after the heat medium is removed of water by the moisture separator 27.

The filtering unit 30 includes a filtering tank 31, a cooling coil within the tank 31, a pump 33 outside the filtering tank 31, and a filter 34. The heat medium 12 is fed from the bottom portion of the vapor generating tank 4 into the filtering tank 31. A chilled water is passed from the outside through the cooling coil 32, to thereby cool down the heat medium 12 to precipitate flux contained in the heat medium 12. The pump 33 is used to suck the heat medium 12 from the filtering tank 31 and to transfer the heat medium to the filter 34. The filter 34 is used to remove the flux precipitated from the cooled heat medium 12 and to return the heat medium alone back to the inlet side cooler having the inlet side cooling coil 8.

In the vapor reflow soldering apparatus shown in FIG. 1, the heat medium 12 contained in the bottom portion of the vapor generating tank 4 is heated to be boiled by the heater 7. The saturated vapor 13 of the heated and evaporated heat medium 12 rises to the upper portion of the vapor generating tank 4 to heat the articles 17 to be soldered and a part of the vapor 13 is condensed and liquefied to drop to collect again in the bottom portion of the vapor generating tank 4.

The saturated vapor 13 that has flowed into the inlet side delivery path 5 and the outlet side delivery path 6 is cooled down to be liquefied by the inlet side cooling coil 8 and the outlet side cooling coil 9, and is returned back to the lower portion of the vapor generating tank 4 through the pipes 18. A small amount of the rest of the vapor is introduced into the discharge gas collecting unit 24 through the inlet side discharge port 10 and the outlet side discharge port 11, and is cooled to be liquefied by the discharge gas cooling coil 25, so that a part of the vapor is collected in the demister 26 and stored in the moisture separator 27, where the heat medium 12 and the water are separated away from each other due to the difference in specific weight therebetween. The heat medium 12 thus separated of water is returned back to the vapor generating tank 4 by the pump 28. On the other hand, the discharge gas is discharged to the atmosphere or a localized discharge system. In order to enhance the collection performance, a low temperature water is passed through the discharge gas cooling coil 25 from the chiller 29.

The articles 17 to be processed or soldered are first transferred into the preheating chamber 2 by the conveyor. The articles 17 that have been conveyed into the preheating chamber 2 are heated by the upper preheater 14 and the lower preheater 15, after the preheating the articles 17 are transferred into the vapor generating tank 4 of the reflow chamber 1 by the conveyor 16.

The articles 17 to be soldered that have been conveyed into the vapor generating tank 4 by the conveyor 16 come in contact with the saturated vapor 13 to be heated. As a result, in the vapor generating tank 4, the solder material on the articles is heated and molten through the condensation latent heat of the saturated vapor 13 to thereby solder parts on the articles. Subsequently, the soldered articles 17 are introduced into the discharge side delivery path 6 to be gradually cooled down, and are then forcibly cooled by the cooling fans 19 in the cooling chamber 3 to be conveyed out of the reflow chamber 1.

When the solder material is molten within the vapor generating tank 4, the flux contained in the solder material is mixed into the heat medium 12. In order to remove the flux, the heat medium 12 is moved from the vapor generating tank 4 to the filtering tank 31 of the filtering unit 30. When the heat medium 12 is cooled, the flux therein is precipitated. Therefore, the heat medium 12 is fed to the filter 34 by the pump 33 to thereby remove the flux from the heat medium 12. Then, the heat medium is again returned back to the vapor generating tank 4 through the inlet side cooler.

Incidentally, the structure and operation of such a vapor reflow type soldering apparatus are well described in the U.S. patents referred to in the introductory part of this specification. The disclosure of the patents referred to herein is hereby specifically and totally incorporated herein by reference.

The present inventors have found that the above-described vapor reflow type soldering apparatus has room for the improvement as follows.

(1) Since the chilled water always runs through the filtering unit 30 having the cooling coil 32, in the case where the humidity in the factory or workshop is high, moisture contained in the air condenses into dew which is collected in the filtering tank 31. This moisture is liable to enter into the vapor generating tank 4. In such case, the moisture would react with thermally decomposed products, which are generated from the heat medium when the medium boils, to form hydrogen fluoride.

(2) When the heat medium 12 containing the flux is cooled down, the concentration of a residual flux in the heat medium is lowered if the temperature of the heat medium 12 is decreased as much as possible, thereby enhancing the effect of the filtration. However, as described in the foregoing paragraph (1), the moisture contained in the air causes the above problem, and therefore there is a limit to the cooling temperature for the heat medium 12. Accordingly, city or industrial water is used as the chilling water. As a result, the time period for cooling is different according to seasons and in particular, it must be long in summer time.

The present invention has been made in view of the foregoing. In order to overcome the problems, according to the invention, the discharge gas collecting unit and the filtering unit are connected to each other through pipes, and further provided is a valve means for allowing chilled water to flow from the discharge gas collecting unit to the filtering unit only during the filtering operation.

In the above-described vapor reflow type soldering apparatus, in order to enhance the heat medium collection performance of the discharge gas collection unit, the discharge gas containing the heat medium is cooled by using the low temperature chilled water. On the other hand, since the power source of the heater of the vapor generating tank is interrupted during the filtering operation, the thermal load imposed on the discharge gas collecting unit is reduced.

Therefore, according to the invention, the above-described valve means is switched over only during the filtering operation, the chilled water on the side of the discharge gas collecting unit is introduced into the filtering unit through the pipes, thereby cooling the heat medium containing flux. As a result, the filtering unit can utilize the low temperature chilled water to cool the heat medium to thereby reduce the time period for filtering. Also, during the filtering operation, the filtering unit may operate at a constant temperature irrespective of seasons, thus enhancing the filtering effect and preventing the occurrence of condensation of moisture within the filtering tank.

Subsequently, referring to FIGS. 2 to 4, vapor reflow type soldering apparatus in accordance with the embodiments of the invention will now be described. In the following embodiments, the same reference numerals as in the apparatus shown in FIG. 1 will be used to indicate the like members or components to omit the explanation thereof, and differences of the embodiments from the described apparatus will be described.

Figure 2:
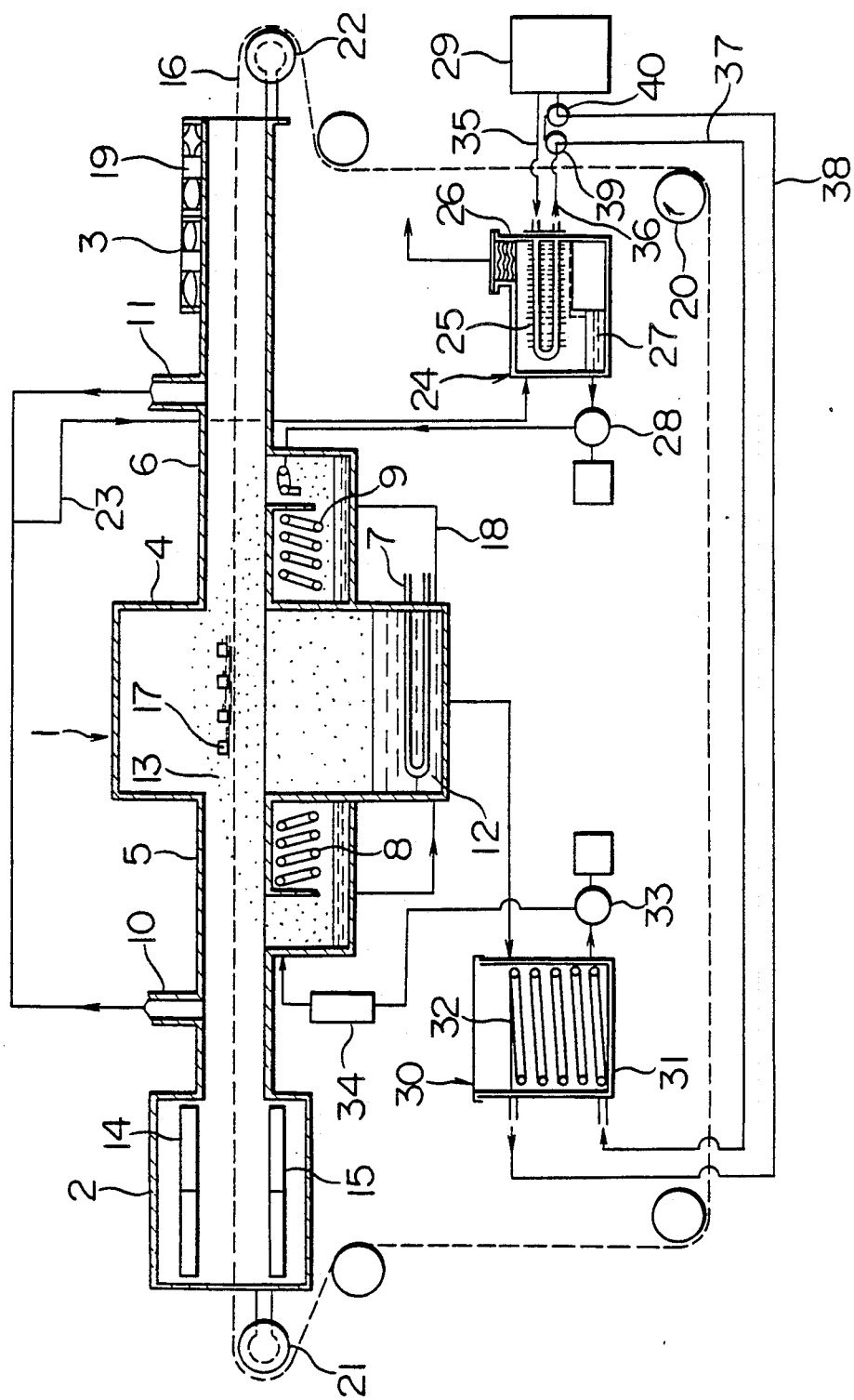
FIG. 2 is a cross-sectional view showing a vapor reflow type soldering apparatus in accordance with one embodiment of the invention.

In the embodiment shown in FIG. 2, the cooling coil 32 of the filtering unit 30 is connected through a chilled water feed pipe 37 and a chilled water return pipe 38 to a chilled water pipe 36 which is the return side one of feed and return pipes 35 and 36 connecting the discharge gas collecting unit 24 and the discharge gas cooling coil 25.

Three-way valves 39 and 40 are interposed in connection portions of the chilled water pipe 36 to the chilled water pipes 37 and 38. These three-way valves 39 and 40 are opened only during the filtering operation, so that the chilled water is passed from the discharge gas collection unit 24 to the cooling coil 32 of the filtering unit 30.

In the embodiment shown in FIG. 2, after the completion of the reflow operation, the heat medium 12 contained in the bottom portion of the vapor generating tank 4 is introduced into the filtering tank 31 of the filtering unit 30. The heat medium 12 contain flux mixed thereinto when the solder is molten.

At this time, the three-way valves 39 and 40 are switched over so that the chilled water is once introduced into the discharge gas cooling coil 25 of the discharge gas collecting unit 24 through the chilled water pipe 35 on the feed side from the chiller 29. Thereafter, the chilled water is introduced from the return side chilled water pipe 36 through the feed side chilled water pipe 37 to the cooling coil 32 of the filtering unit 30. The chilled water is passed through the cooling coil 32 and is then again returned back to the chiller 29 from the feed side chilled water pipe 38 through the return side chilled water pipe 36.

By passing the chilled water through the cooling coil 32 of the filtering unit 30, the heat medium 12 with flux introduced into the filtering tank 31 is cooled to precipitate the flux. The heat medium 12, which has been cooled, with the precipitated flux is transferred to the filter 34 by the pump 33. After the flux is removed from the heat medium by the filter 34, the heat medium 12 is fed to the inlet side cooler having the inlet side cooling coil 8, through which the heat medium is returned to the vapor generating tank 4, to thereby complete the filtering operation.

In this embodiment, during the filtering operation, the chilled water kept at a temperature of, for example, 5° C. to 10° C., which water is to be fed from the chiller 29 to the discharged gas collecting unit 24, is passed through the cooling coil 32 of the filtering unit 30. Therefore, it is possible to reduce a filtering time and also to filter with the chilled water kept substantially at a constant temperature, to thereby eliminate the change in filtering time and effect according to seasons.

In addition, in this embodiment, since the chilled water is passed through to the cooling coil 32 of the filtering unit 30 from the discharge gas collection unit 24 side only during the filtering operation, it is possible to avoid a phenomenon in which the moisture contained in the air would condense and remain in the filtering tank 31 of the filtering unit 30.

Figure 3:
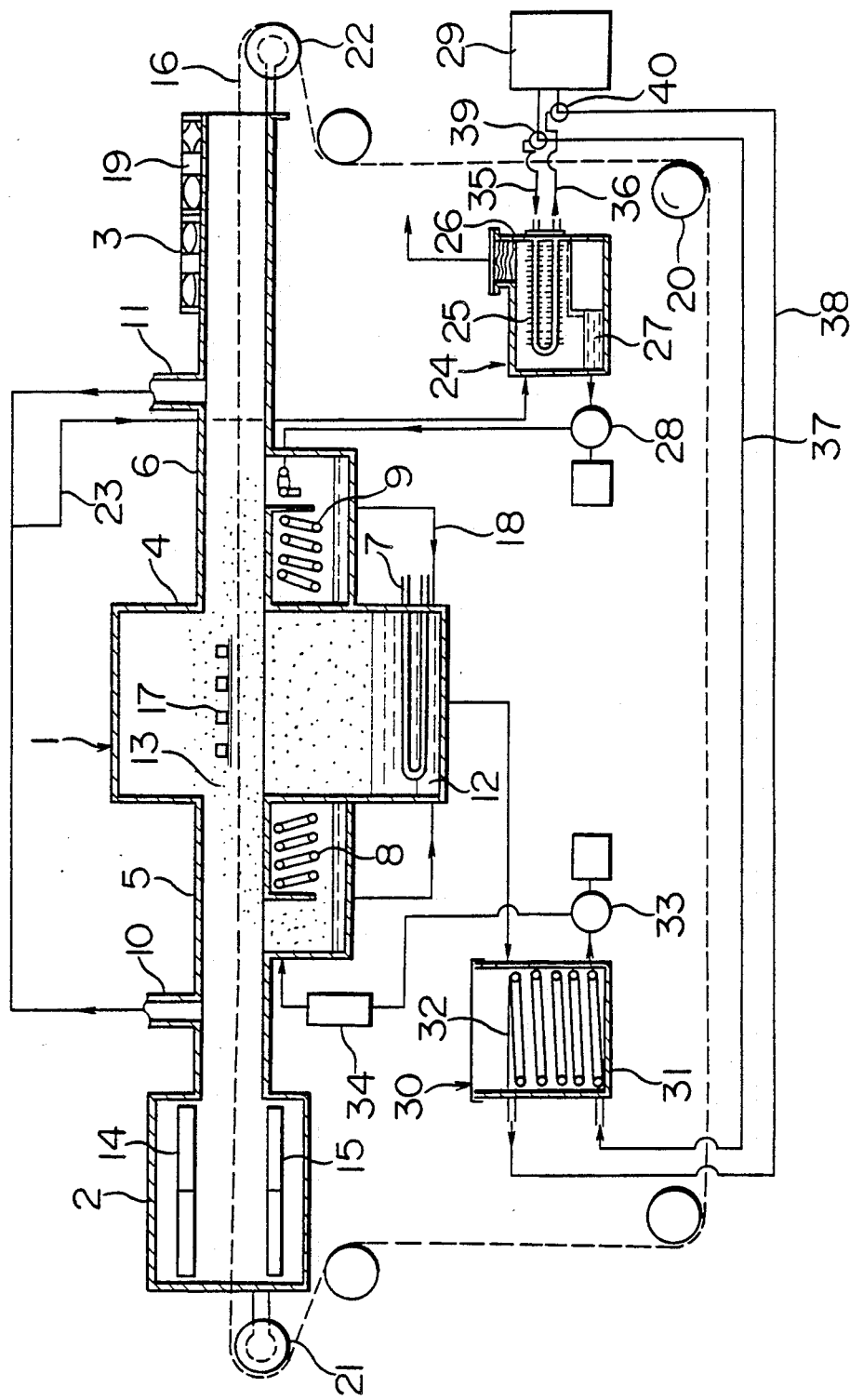
FIG. 3 is a cross-sectional view showing a vapor reflow type soldering apparatus in accordance with another embodiment of the invention.

FIG. 3 shows another embodiment of the invention.

In the embodiment shown in FIG. 3, a feed side chilled water pipe 37 and a three-way valve 39 are connected to a feed side cooling pipe 35 which connects the discharge gas cooling coil 25 of the discharge gas collecting unit 24 and the chiller 29 to each other. A return side chilled water pipe 38 and a three-way valve 40 are connected to a return side cooling water pipe 36.

Figure 4:
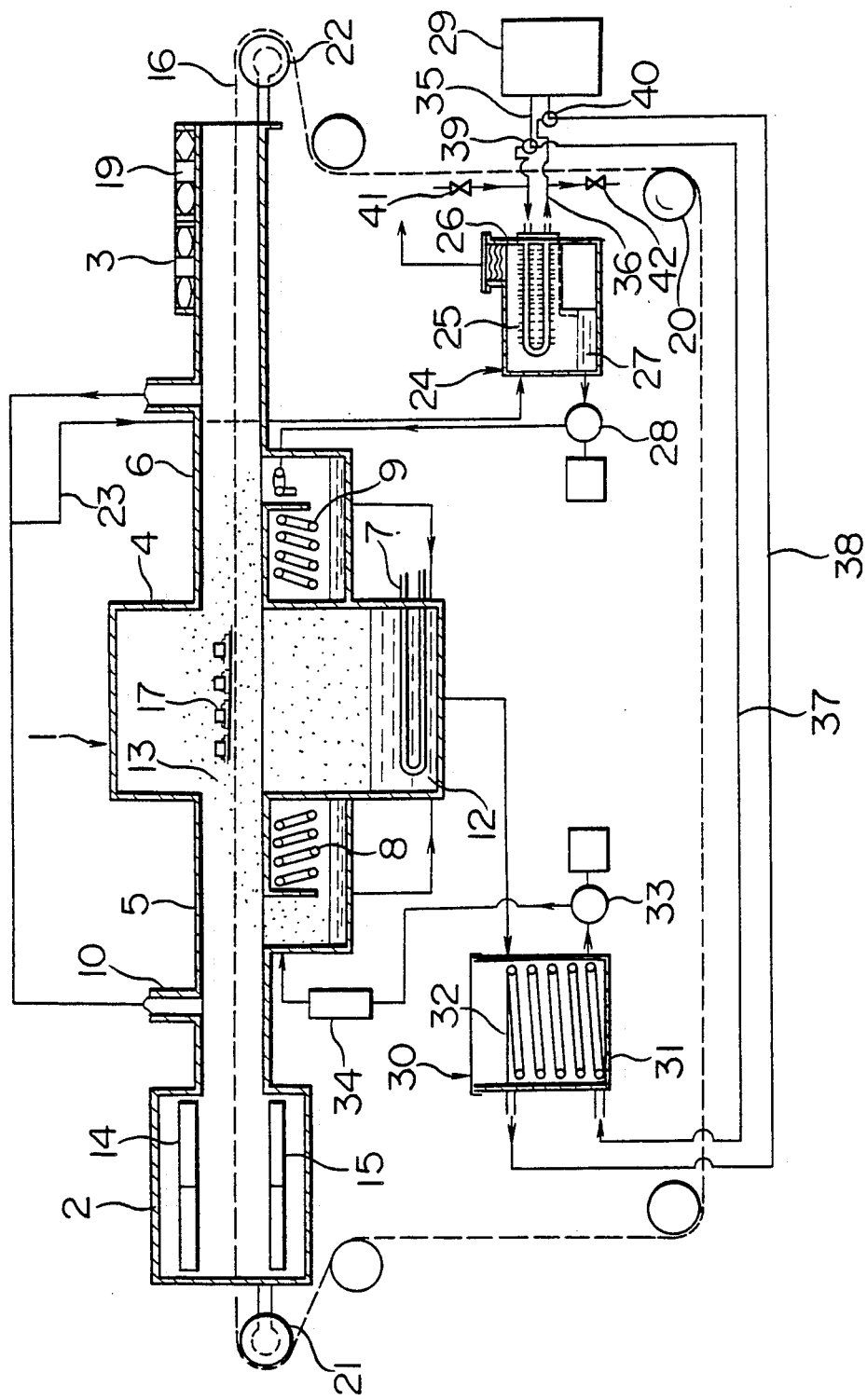
FIG. 4 is a cross-sectional view showing a vapor reflow type soldering apparatus in accordance with still another embodiment of the invention.

FIG. 4 shows another embodiment of the invention.

In the embodiment shown in FIG. 4, a valve 41 as well as the feed side chilled water pipe 37 and the three-way valve 39 is connected to a feed side cooling water pipe 35 that connects the discharge gas cooling coil 25 of the discharge gas collecting unit 24 and the chiller 29 to each other. A valve 42 as well as the return side chilled water pipe 38 and the three-way valve 40 is connected to the return side chilled water pipe 38.

In this embodiment, the heat medium 12 containing flux and stagnating in the bottom portion of the vapor tank 4 is introduced into the filtering unit 30, after which the change-over of the three-way valves 39 and 40 causes the chilled water supplied from the chiller 29 to pass through the cooling coil 32 of the filtering unit 30. Thereafter, the valves 41 and 42 connected to the drinkable water or industrial water are opened to thereby cause the chilled water to pass through the discharge gas cooling coil 25 of the discharge gas collecting unit 24.

The operation and the structure of the embodiments shown in FIGS. 3 and 4 are the same as those of the embodiment shown in FIG. 2 except that the chilled water of the chiller 29 is all supplied to the filtering unit 30 during the filtering operation.

As has been described above, according to the present invention, the chilled water kept substantially at a constant low temperature on the discharge gas collecting unit is caused to pass through filtering unit through the chilled water pipes and valves during the filtering operation, whereby the heat medium containing flux is cooled down to thereby precipitate the flux. Accordingly, it is possible to effectively decrease the temperature of the heat medium in comparison with the case of a cooling mode by using the drinkable water or industrial water. It is therefore possible to reduce a filtering time and to eliminate a change in filtering time and effect according to the season.

Also, according to the invention, since by selectively opening/closing valves, the chilled water is caused to pass through the filtering unit only during the filtering operation, it is possible to overcome the defect where the moisture contained in the air would be stagnant in the filtering tank of the filtering unit. As a result, it is possible to perform the soldering operation in low cost without fail while keeping the recirculated heat medium under a good condition.

Although the present invention has been explained on the basis of the specific embodiments, it is apparent that the invention is not limited thereby and thereto. It is possible for those skilled artisan to make various modifications thereto within the scope of the appended claims.

What is claimed is:

1. A vapor reflow type soldering apparatus comprising:
   a tank means for filling saturated vapor of a heat medium;
   means for transferring an article to be processed through said tank means to bring a solder material on the to-be-processed article into contact with the saturated vapor to heat and melt the solder material;
   a discharge gas collecting means having a chilled water system for cooling discharge gas from said tank means to collect the heat medium contained in the discharge gas and return the thus collected heat medium back to said tank means; and
   means for separating a flux melted out of a molten solder material from the heat medium in said tank means, said separating means including means connecting the chilled water system of said discharge gas collecting means to said means for separating for selectively introducing chilled water of the chilled water system to the means for separating for cooling heat medium in said means for separating.

2. The apparatus according to claim 1, wherein a temperature of the chilled water is kept substantially constant.

3. A vapor reflow type soldering apparatus comprising:
   a tank means for filling saturated vapor of a heat medium;
   means for transferring an article to be processed through said tank means to bring a solder material on the to-be-processed article into contact with he saturated vapor to heat and melt the solder material;

a discharge gas collecting means having a chilled water system for cooling discharge gas from said tank means to collect the heat medium contained in the discharge gas and return the thus collected heat medium back to said tank means; and means for separating a flux melted out of a molten solder material from the heat medium in said tank means, said separating means being connected to the chilled water system of said discharge gas collecting means to selectively introduce chilled water of the chilled water system to cool the heat medium, and further comprising a first valve means provided in said chilled water system for selectively connecting said separating means to the chilled water system of said discharge gas collecting means.

4. The apparatus according to claim 3, wherein said valve means operates for introducing all the chilled water flowing through said chilled water system into said separating means.

5. The apparatus according to claim 4, wherein said valve means is arranged so as to introduce into said separating means the chilled water that has passed through said discharge gas collecting means.

6. The apparatus according to claim 4, wherein said valve means is arranged so as to introduce into said separating means the chilled water before the water flows into said discharge gas collecting means.

7. The apparatus according to claim 6, further comprising a second valve means provided in a portion of said chilled water system between said discharge gas collecting means and said first valve means for introducing one of city water and industrial water to said discharge gas collecting means.

8. A vapor reflow type soldering apparatus comprising:

a tank storing a liquid heat medium;

a heater means for boiling the heat medium within said tank to generate saturated vapor thereof;

a passage defined through said tank;

means for conveying an article to be processed along said passage to bring a solder material on said article in contact with the saturated vapor filled within said tank to heat and melt the solder material;

cooling means provided respectively on portions of said passage on both sides of said tank for cooling the saturated vapor to collect the heat medium therein, means for collecting the heat medium from discharge gas passing through said passage to return the heat medium back to said tank, said collecting and returning means having a chilled water system through which a constant temperature chilled water is caused to pass for cooling the discharge gas and condensing the heat medium;

means connected to said tank for separating a flux melted out of the molten solder material by cooling said heat medium in said tank; and means for selectively introducing the chilled water of said chilled water system of said discharge gas collecting means into said separating means, said introducing means including pipes for connecting said separating means and said chilled water system and a switching valve means for selectively providing communication of said chilled water system with said pipes.

9. The apparatus according to claim 8, wherein said valve means is arranged to introduce into said separating means all the chilled water that has passed through said discharge gas collecting means.

10. The apparatus according to claim 8, wherein said valve means is arranged to introduce into said separating means all the chilled water before the water flows into said discharge gas collecting means.

11. The apparatus according to claim 10, further comprising a second valve means provided in a portion of said chilled water system between said discharge gas collecting means and said first valve means for introducing one of city water and industrial water into said discharge gas collecting means.

* * * * *